United States Patent
Park

(10) Patent No.: US 10,023,053 B2
(45) Date of Patent: Jul. 17, 2018

(54) BATTERY MANAGEMENT SYSTEM AND METHOD

(71) Applicant: HYUNDAI AUTRON CO., LTD., Seongnam-si (KR)

(72) Inventor: Jae-Seong Park, Suwon-si (KR)

(73) Assignee: Hyundai Autron Co., Ltd., Seongnam-si (KR)

( * ) Notice: Subject to any disclaimer, the term of this patent is extended or adjusted under 35 U.S.C. 154(b) by 267 days.

(21) Appl. No.: 14/943,324

(22) Filed: Nov. 17, 2015

(65) Prior Publication Data

US 2016/0137147 A1 May 19, 2016

(30) Foreign Application Priority Data

Nov. 17, 2014 (KR) .......................... 10-2014-0159972

(51) Int. Cl.
*B60L 11/18* (2006.01)
*B60R 16/023* (2006.01)

(52) U.S. Cl.
CPC ........... *B60L 11/18* (2013.01); *B60L 11/1853* (2013.01); *B60L 11/1861* (2013.01); *B60L 11/1866* (2013.01); *Y02T 10/7005* (2013.01); *Y02T 10/7044* (2013.01); *Y02T 10/7061* (2013.01); *Y02T 90/16* (2013.01)

(58) Field of Classification Search
None
See application file for complete search history.

(56) References Cited

U.S. PATENT DOCUMENTS

| 2005/0143878 A1* | 6/2005 | Park | B60K 6/48 701/22 |
| 2011/0078092 A1* | 3/2011 | Kim | B60L 11/1824 705/412 |
| 2016/0243954 A1* | 8/2016 | Moro | H02H 7/18 |

FOREIGN PATENT DOCUMENTS

| KR | 10-2010-0124499 A | 11/2010 |
| KR | 10-2012-0054427 A | 5/2012 |

OTHER PUBLICATIONS

Korean Intellectual Property Office, Office Action for Korean patent application No. 10-2014-0159972, dated Jun. 27, 2015, Korea.

* cited by examiner

*Primary Examiner* — Jared Fureman
*Assistant Examiner* — Aqeel Bukhari
(74) *Attorney, Agent, or Firm* — Baker McKenzie; Hyunho Park

(57) ABSTRACT

Disclosed is a battery management system, the battery management system including: a module control unit (MCU) which includes a communication module, a capacitor which is connected to the communication module, and a charging module which is connected to the capacitor to charge the capacitor; and a battery control unit (BCU) which transmits a square wave clock signal which enables a communication module of the MCU and controls the MCU, in which when the capacitor is charged with a voltage which is equal to or higher than a predetermined reference voltage, the MCU turns on the communication module.

11 Claims, 3 Drawing Sheets

BATTERY MANAGEMENT SYSTEM AND METHOD

CROSS-REFERENCE TO RELATED APPLICATIONS

This application claims priority to and the benefit of Korean Patent Application No. 10-2014-0159972 filed in the Korean Intellectual Property Office on Nov. 17, 2014, the entire contents of which are incorporated herein by reference.

TECHNICAL FIELD

The present invention relates to a battery management system which is used for an apparatus using electric energy, and more particularly, to a battery management system in which a module control unit (MCU) is driven without being supplied with normal power from a battery control unit (BCU) in a high voltage battery management system used in a hybrid vehicle, a plug-in hybrid vehicle, and an electric vehicle.

BACKGROUND ART

Recently, various apparatuses which use high voltage batteries, such as industrial equipment, home appliance, and vehicles appear. Specifically, the high voltage batteries are more actively used in a field of a vehicle technology.

A vehicle which uses an internal combustion engine using a fossil fuel such as gasoline or heavy oil as a major fuel seriously influences environmental contamination such as air pollution. Therefore, recently, people exert great efforts to develop an electric vehicle or a hybrid vehicle, in order to reduce environmental contamination.

The electric vehicle (EV) refers to a vehicle which uses an electric battery and an electric motor without using oil fuel and an engine. That is, a motor rotates by electricity accumulated in a battery to drive the vehicle. The electric vehicle was developed earlier than a gasoline vehicle. However, the electric vehicle is not commercially used due to problems such as a heavy weight of a battery and a time to charge the battery. As energy and environmental problems become serious, studies to commercialize the electrical vehicle start since the 1990s.

In the meantime, as a battery technology rapidly improves in recent years, an electric vehicle and a hybrid vehicle (HEV) which adaptively uses a fossil fuel and electric energy are commercially used.

Since the HEV uses both gasoline and electricity as a power source, the HEV is positively evaluated in view of improvement of power efficiency and reduction of exhaust gas. A main issue of the HEV is how to overcome a price difference from the gasoline vehicle. However, in the HEV, an amount of mounted secondary cells may be reduced to one third of that of the electric vehicle. Therefore, the price of the HEV may be reduced as compared with the electric vehicle, so that the HEV is expected to play an intermediate role in evolution to a perfect electric vehicle.

In the HEV and the EV which use the electric energy, a battery in which a plurality of chargeable secondary cells is formed to be one pack is used as a major power source. Therefore, the HEV and the EV has an advantage in that no exhaust gas is generated and noise is very small.

As described above, in the vehicle which uses the electric energy, performance of the battery directly affects a performance of the vehicle. Therefore, a battery management system (BMS) which not only measures a voltage of each battery cell, and a voltage and a current of the entire battery to efficiently manage to charge or discharge the battery cell but also monitors a status of a cell sensing IC which senses each battery cell to stably control the cell is acutely required.

FIG. 1 is a diagram illustrating a battery management system according to a related art.

Referring to FIG. 1, a vehicle battery management system 100 includes a battery stack 10 including a plurality of battery modules, a vehicle electrical system 20, and a battery monitoring system 30.

The battery stack 10 includes a plurality of battery modules 11 and 12. The battery modules 11 and 12 include a plurality of battery cells 13. The battery stack 10 supplies a charged high voltage DC power to the vehicle electrical system 20.

The battery monitoring system 30 includes a plurality of MCUs 31 and 32 and a BCU 33 which controls the MCUs. The battery monitoring system 30 is connected to the battery stack to monitor a charged/discharged state of the battery stack 10 and controls a charging/discharging operation of the battery stack 10.

The plurality of MCUs 31 and 32 is connected to the plurality of battery modules 11 and 12, respectively, to monitor operating characteristics of the battery modules 11 and 12 or the battery cell 13. For example, the MCU 31 monitors operating characteristics such as a voltage, a current, a charged state, or a temperature of the battery module 11 or the battery cell 13.

The plurality of MCUs 31 and 32 is connected to the plurality of battery modules 11 and 12, respectively, to control operations of the battery modules 11 and 12 or the battery cell 13. For example, the MCU 31 controls the battery module 11 or the battery cell 13 to be charged or discharged through a result of monitoring the battery module 11 or the battery cell 13.

The BCU 33 is connected to the plurality of MCUs 31 and 32 to receive information on operating characteristics of the battery modules 11 and 12 or the battery cell 13 from the plurality of MCUs 31 and 32. Further, the BCU 33 may transmit information for controlling the battery modules 11 and 12 or the battery cell 13 to the plurality of MCUs 31 and 32 based on the information received from the plurality of MCUs 31 and 32.

The plurality of MCUs 31 and 32 needs to be supplied with driving power from the outside to control the battery modules 11 and 12 and communicate with the BCU 33. Generally, the plurality of MCUs 31 and 32 is connected to a separate power supply or is supplied with low power through the BCU 33.

However, when an engine of the vehicle is turned off, the plurality of MCUs 31 and 32 does not receive the power from the BCU 33. Therefore, appropriate cell balancing of the battery modules 11 and 12 cannot be accomplished.

The plurality of MCUs 31 and 32 does not always operate. Generally, only when the plurality of MCUs 31 and 32 is in an idle mode, that is, inactive state and then it is determined that it is required to control the battery module, the plurality of MCUs 31 and 32 receives a wake-up signal from the BCU 33 to perform a control operation. Also in this case, according to the related art, the plurality of MCUs 31 and 32 is supplied with the normal power from the BCU 33 so that the power is unnecessarily consumed and efficiency of the BMS is lowered.

When the normal power is supplied to the plurality of MCUs 31 and 32, leakage/stand-by current of the battery management system (BMS) is undesirably increased.

SUMMARY OF THE INVENTION

The present invention has been made in an effort to provide a battery management system which communicates between a BCU and an MCU without supplying a normal power to the MCU and a control method thereof.

The present invention has also been made in an effort to provide a battery management system which supplies power only when the MCU requires communication to suppress leakage current and stand-by current and a control method thereof.

An exemplary embodiment of the present invention provides a battery management system including: a module control unit (MCU) which includes a communication module, a capacitor which is connected to the communication module, and a charging module which is connected to the capacitor to charge the capacitor; and a battery control unit (BCU) which transmits a square wave clock signal which enables a communication module of the MCU and controls the MCU, in which when the capacitor is charged with a voltage that is equal to or higher than a predetermined reference voltage, the MCU turns on the communication module.

The MCU may receive a plurality of square wave clock signals that are different phases from the BCU.

The MCU may receive a plurality of square wave clock signals which has different phases and is transmitted for a predetermined time or longer, from the BCU.

When the voltage charged in the capacitor is equal to or higher than the predetermined reference voltage, the MCU may amplify the voltage charged in the capacitor to transmit the voltage to the communication module to turn on the communication module.

When the communication module is turned on, the MCU may transmit a signal indicating that communication is available to the BCU.

The MCU may be driven without being supplied with normal power from the BCU.

Another exemplary embodiment of the present invention provides a battery management method including: a signal receiving step of receiving, by a module control unit (MCU), a square wave clock signal which enables a communication module of the MCU, from a battery control unit (BCU); a charging step of charging, by a charging module of the MCU, a capacitor which is connected to the communication module using the received signal; a determining step of determining, by the MCU, whether a voltage charged in the capacitor is equal to or higher than a predetermined reference voltage; and a communication preparation step of turning, by the MCU, on the communication module when the voltage charged in the capacitor is equal to or higher than the predetermined reference voltage.

In the signal receiving step, the charging module may receive a plurality of square wave clock signals having different phases, from the BCU.

In the signal receiving step, the charging module may receive a plurality of square wave clock signals which has different phases and is transmitted for a predetermined reference time or longer, from the BCU.

When the voltage charged in the capacitor is equal to or higher than the predetermined reference voltage, in the communication preparation step, the voltage charged in the capacitor may be amplified to transmit the voltage to the communication module to turn on the communication module.

The method may further include a signal transmitting step of transmitting a signal indicating that the communication module can communicate with the BCU when the communication module is turned on through the communication preparation step.

According to the present invention, communication between a BCU and an MCU is performed without supplying normal power to the MCU.

The power is supplied only when the MCU requires communication, thereby suppressing leakage current and stand-by current.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
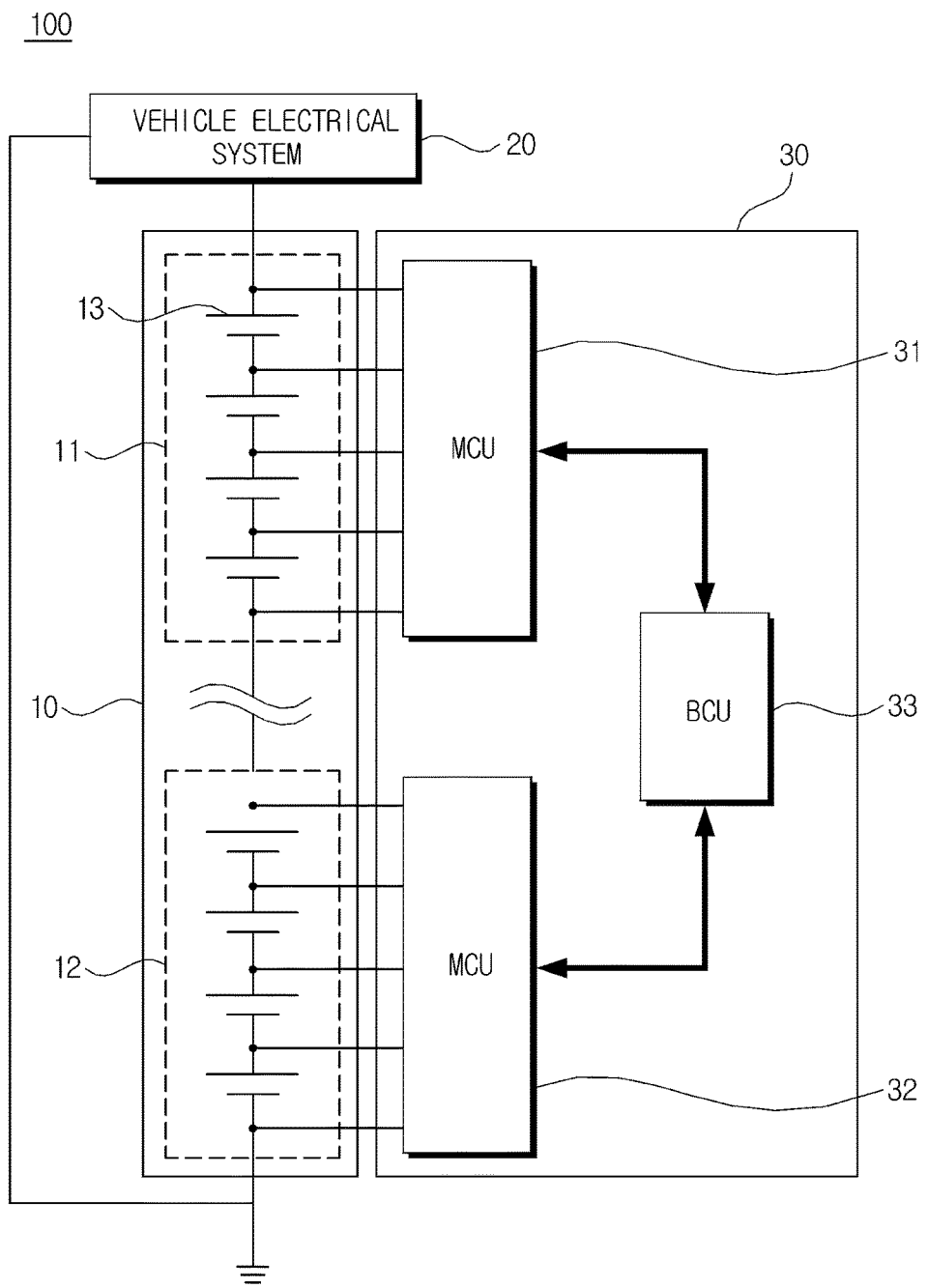
FIG. 1 is a diagram illustrating a battery management system according to a related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings.

When the exemplary embodiment is described, a technology which is well known in the technical field of the present invention and is not directly related with the present invention will not be described. The reason is that unnecessary description is omitted to clearly transmit the gist of the present invention without obscuring the gist of the present invention.

By the same reason, in the accompanying drawings, some components are exaggerated, omitted, or schematically illustrated. Further, an actual size is not fully reflected to the size of each component. In the drawings, like reference numerals denote like components.

Hereinafter, a battery management system according to an exemplary embodiment of the present invention will be described with reference to FIG. 2.

Figure 2:
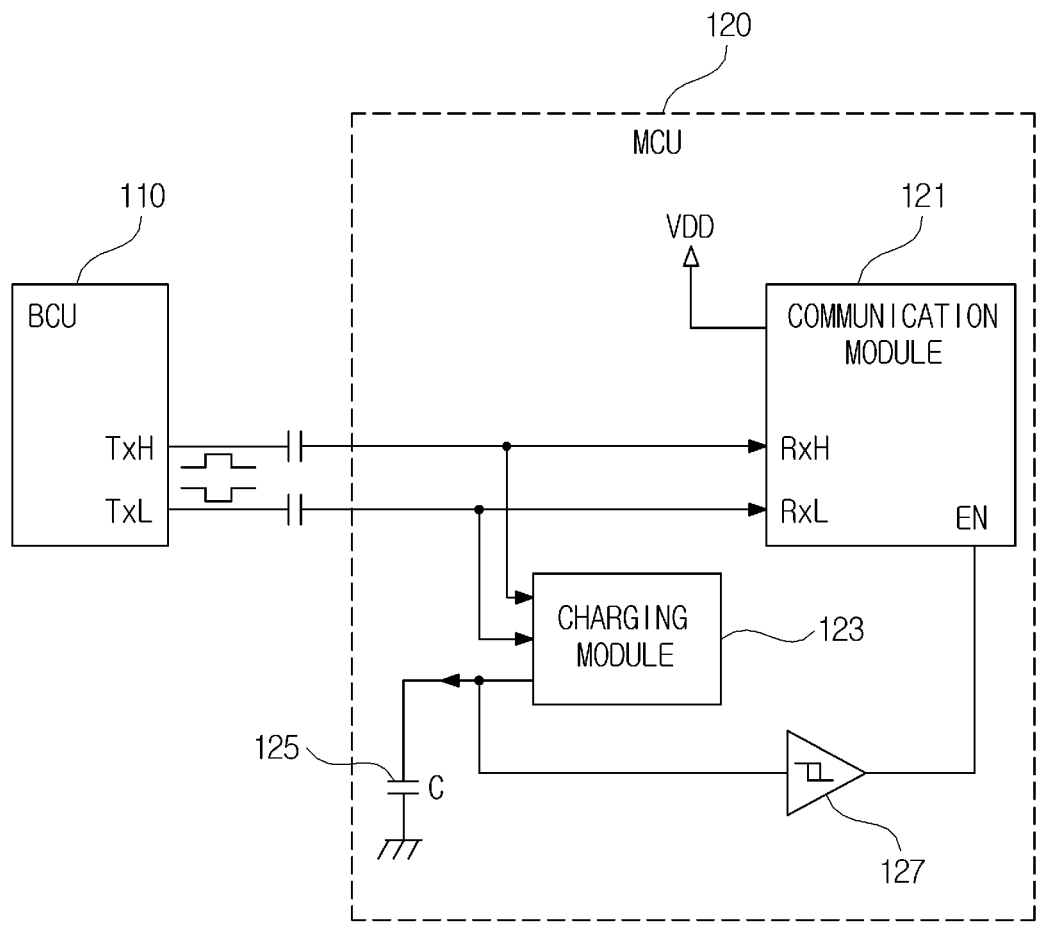
FIG. 2 is a block diagram of a battery management system according to an exemplary embodiment of the present invention.

FIG. 2 is a block diagram of a battery management system according to an exemplary embodiment of the present invention.

Referring to FIG. 2, a battery management system 200 according to an exemplary embodiment of the present invention includes a battery module (not illustrated), a BCU 110, and an MCU 120.

The battery module includes a plurality of battery cells and a plurality of battery modules may be provided. The plurality of battery modules supplies a charged high voltage DC power to a motor which is provided in a vehicle and receives a charged voltage through a charging device. Further, even though in FIG. 2, one MCU is illustrated for the convenience of description, a plurality of MCUs may be provided in the exemplary embodiment of the present invention and the plurality of battery modules is connected to a plurality of MCUs, respectively.

The plurality of MCUs monitors operating characteristics such as a voltage, a current, a charged state, and a temperature of the plurality of battery cells of the battery module which is connected to the MCUs.

The plurality of MCUs controls the plurality of battery cells of the battery module to be charged or discharged through a result of monitoring the plurality of battery cells of the battery module which is connected to the MCUs. For example, when a degree of charging the battery cell exceeds a predetermined charging threshold value, the MCU discharges the battery cell. In contrast, when the degree of charging the battery cell is below a predetermined discharging threshold value, the MCU charges the battery cell.

The BCU 110 is connected to the MCU 120. Therefore, the BCU 110 receives information on the operating characteristics of the battery module through the MCU 120. By doing this, the BCU 110 controls the charged or discharged state of the battery module through the MCU 120.

The BCU 110 transmits a square wave clock signal which enables a communication module 121 of the MCU 120.

The BCU 110 transmits the square wave clock signal to the MCU 120, so that the MCU 120 may be driven without being supplied with the normal power from the BCU 110. The square wave clock enable signal may include both a signal which supplies power to drive the MCU 120 and a wake-up signal which allows the MCU 120 to communicate with the BCU 110. Therefore, the BCU 110 does not need to transmit a separate power signal which drives the MCU 120.

In this case, the enable signal may refer to a plurality of square wave clock signals having different phases. Specifically, the signal refers to two square wave clock signals having a phase difference of 180 degrees. The square wave clock signal is set by an experiment to have a sufficient value in order to charge a capacitor 125 to have a predetermined voltage or higher and is transmitted. By doing this, the voltage is more easily charged to the capacitor 125.

The MCU 120 receives the enable signal through the charging module 123. The charging module 123 charges the capacitor 125 through the enable signal.

The charging module 123 charges the capacitor 125 through a high value of the enable signal.

The capacitor 125 is charged until the voltage is equal to or higher than a predetermined voltage value through the enable signal. For example, it is assumed that the charged voltage value is 1.8 V.

The capacitor 125 is connected to the communication module 121. Specifically, the capacitor is connected to an enable (EN) pin of the communication module 121. In this case, when the voltage value of the capacitor 125 is equal to or high than a predetermined reference voltage, the MCU 120 turns on the communication module 121.

When the voltage which is charged in the capacitor 125 is equal to or higher than the predetermined reference voltage, the MCU 120 amplifies the voltage charged in the capacitor 125 to transmit the voltage to the communication module 121, thereby turning on the communication module 121.

For example, it is assumed that a Schmitt trigger circuit 127 is connected to the capacitor 125. The Schmitt trigger circuit 127 is a circuit in which an output waveform is increased when an input voltage is increased to be equal to or higher than a predetermined value and the output waveform is lowered when the input voltage is decreased to be equal to or lower than the predetermined value.

Therefore, when the voltage charged in the capacitor 125 is equal to or higher than the predetermined voltage value and the voltage passes through the Schmitt trigger circuit 127, a voltage which is higher than the charged voltage of the capacitor 125 is output to the communication module 121. Accordingly, the communication module 121 is turned on.

In contrast, when the voltage charged in the capacitor 125 is lower than the predetermined voltage value and the voltage passes through the Schmitt trigger circuit 127, a voltage which is lower than the charged voltage of the capacitor 125 is output to the communication module 121. Accordingly, the communication module 121 is maintained to be turned off.

When the communication module 121 is turned on, the MCU 120 transmits a signal indicating that communication is available to the BCU 110. The signal may refer to an ACK signal.

Hereinafter, a battery management method according to an exemplary embodiment of the present invention will be described with reference to FIG. 3.

Figure 3:
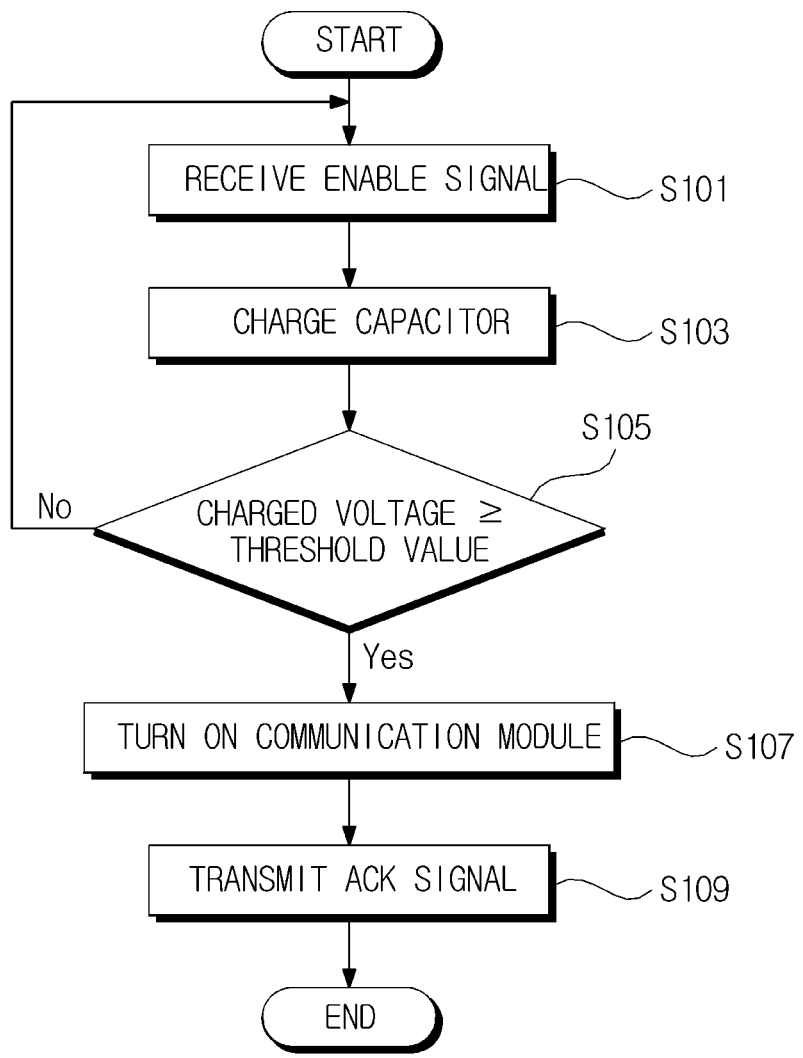
FIG. 3 is a flowchart illustrating a process in which an MCU of the battery management system according to an exemplary embodiment of the present invention is changed to a communication preparation state between the MCU and a BCU.

FIG. 3 is a flowchart illustrating a process in which an MCU of the battery management system according to an exemplary embodiment of the present invention is changed to a communication preparation state between the MCU and a BCU.

First, an MCU 120 receives a signal which enables a communication module 121 of the MCU 120 from a BCU 110 in step S101.

The BCU 110 transmits the square wave clock signal to the MCU 120, so that the MCU 120 may be driven without being supplied with normal power from the BCU 110. The square wave clock enable signal includes both a signal which supplies a power to drive the MCU 120 and a wake-up signal which allows the MCU 120 to communicate with the BCU 110. Therefore, the BCU 110 does not need to transmit a separate power signal which drives the MCU 120.

In this case, the enable signal may refer to a plurality of square wave clock signals having different phases. Specifically, the signal refers to two square wave clock signals having a phase difference of 180 degrees. The square wave clock signal is set by an experiment to have a sufficient value in order to charge a capacitor 125 to have a predetermined voltage or higher and is transmitted. By doing this, the voltage is more easily charged to the capacitor 125.

Thereafter, the charging module 123 charges a capacitor 125 which is connected to the communication module 121 using the received signal (S103).

Thereafter, it is determined whether the voltage charged in the capacitor 125 is equal to or higher than a predetermined reference voltage in step S105.

For example, when the charged voltage value is 1.8 V, it is assumed that the voltage charged in the capacitor 125 is equal to or higher than the predetermined voltage value.

As a result of determination in step S105, when the voltage charged in the capacitor 125 is equal to or higher than the predetermined voltage value, the MCU 120 turns on the communication module 121 in step S107.

When the voltage which is charged in the capacitor 125 is equal to or higher than the predetermined reference value, the MCU 120 amplifies the voltage charged in the capacitor 125 to transmit the voltage to the communication module 121, thereby turning on the communication module 121.

For example, it is assumed that a Schmitt trigger circuit 127 is connected to the capacitor 125. The Schmitt trigger circuit 127 is a circuit in which an output waveform is increased when an input voltage is increased to be equal to or higher than a predetermined value and the output waveform is lowered when the input voltage is decreased to be equal to or lower than the predetermined value.

Therefore, when the voltage charged in the capacitor 125 is equal to or higher than the predetermined voltage value and the voltage passes through the Schmitt trigger circuit 127, a voltage which is higher than the charged voltage of the capacitor 125 is output to the communication module 121. Accordingly, the communication module 121 is turned on.

In contrast, when the voltage charged in the capacitor 125 is lower than the predetermined voltage value and the voltage passes through the Schmitt trigger circuit 127, a voltage which is lower than the charged voltage of the capacitor 125 is output to the communication module 121. Accordingly, the communication module 121 is maintained to be turned off.

Therefore, when the voltage charged in the capacitor 125 is equal to or higher than the predetermined voltage value and the voltage passes through the Schmitt trigger circuit 127, a voltage which is higher than the charged voltage of the capacitor 125 is output to the communication module 121. Accordingly, the communication module 121 is turned on.

In contrast, when the voltage charged in the capacitor 125 is lower than the predetermined voltage value and the voltage passes through the Schmitt trigger circuit 127, a voltage which is lower than the charged voltage of the capacitor 125 is output to the communication module 121. Accordingly, the communication module 121 is maintained to be turned off.

Thereafter, the MCU 120 may transmit a signal indicating that communication is available to the BCU 110 in step S109. The signal may refer to an ACK signal.

When the MCU 120 and the BCU 110 can communicate, the BCU 110 controls the battery cells of the battery module through the MCU 120.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A battery management system for a vehicle, comprising:
   a module control unit (MCU) which includes a communication module, a capacitor which is connected to an enable pin of the communication module, and a charging module which is connected to the capacitor to charge the capacitor; and
   a battery control unit (BCU) which transmits a square wave clock signal which enables a communication module of the MCU and controls the MCU,
   wherein when the capacitor is charged with a voltage that is equal to or higher than a predetermined reference voltage, the MCU turns on the communication module.

2. The system of claim 1, wherein the MCU receives a plurality of square wave clock signals having different phases from the BCU.

3. The system of claim 1, wherein the MCU receives a plurality of square wave clock signals which has different phases and is transmitted for a predetermined time or longer, from the BCU.

4. The system of claim 1, wherein when the voltage charged in the capacitor is equal to or higher than the predetermined reference voltage, the MCU amplifies the voltage charged in the capacitor to transmit the voltage to the communication module to turn on the communication module.

5. The system of claim 1, wherein when the communication module is turned on, the MCU transmits a signal indicating that communication is available to the BCU.

6. The system of claim 1, wherein the MCU is not supplied with a normal power from the BCU.

7. A battery management method, comprising:
   a signal receiving step of receiving, by a module control unit (MCU), a square wave clock signal which enables a communication module of the MCU, from a battery control unit (BCU);
   a charging step of charging, by a charging module of the MCU, a capacitor which is connected to an enable pin of the communication module using the received signal;
   a determining step of determining, by the MCU, whether a voltage charged in the capacitor is equal to or higher than a predetermined reference voltage; and
   a communication preparation step of turning, by the MCU, on the communication module when the voltage charged in the capacitor is equal to or higher than the predetermined reference voltage.

8. The method of claim 7, wherein in the signal receiving step, the charging module receives a plurality of square wave clock signals at different phases, from the BCU.

9. The method of claim 7, wherein in the signal receiving step, the charging module receives a plurality of square wave clock signals which has different phases and is transmitted for a predetermined reference time or longer, from the BCU.

10. The method of claim 7, wherein in the communication preparation step, when the voltage charged in the capacitor is equal to or higher than the predetermined reference voltage, the voltage charged in the capacitor is amplified to be transmitted to the communication module to turn on the communication module.

11. The method of claim 7, further comprising: a signal transmitting step of transmitting a signal indicating that the to communication module can communicate to the BCU when the communication module is turned on through the communication preparation step.

\* \* \* \* \*